Figure 1:
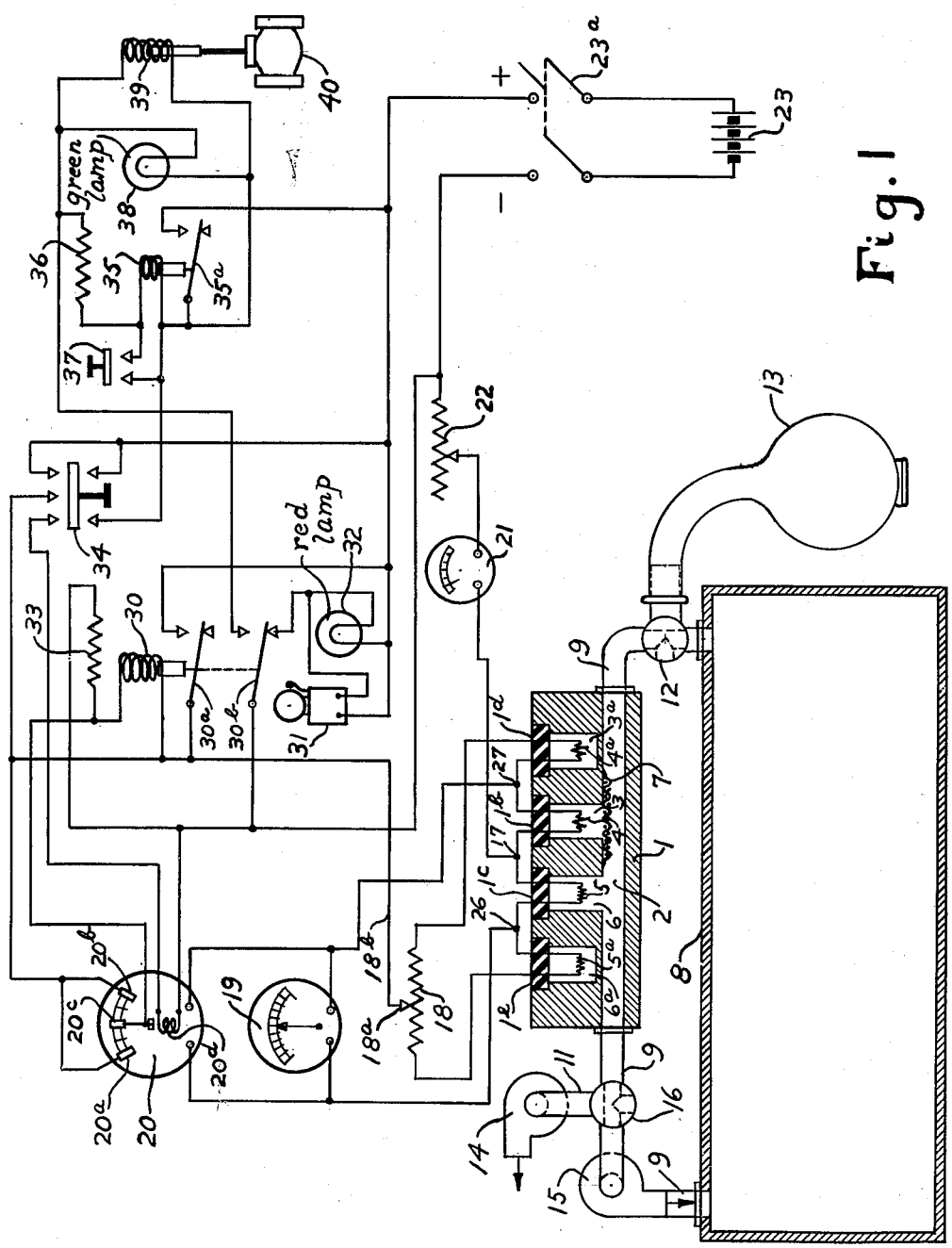

Nov. 18, 1952 — W. J. WILLENBORG — 2,618,150
GAS AND VAPOR MEASURING APPARATUS
Filed Sept. 25, 1947 — 2 SHEETS—SHEET 2

INVENTOR.
Walter J. Willenborg
BY Lawrence K. Sager
his attorney.

Patented Nov. 18, 1952

2,618,150

UNITED STATES PATENT OFFICE 2,618,150

GAS AND VAPOR MEASURING APPARATUS

Walter J. Willenborg, Weehawken, N. J., assignor to Jabez Burns & Sons, Inc., New York, N. Y., a corporation of New York Application September 25, 1947, Serial No. 776,036

12 Claims. (Cl. 73—27)

This invention relates to improved methods and apparatus for detecting, indicating and effecting desired controls as determined by the presence of certain gases and vapors and measuring their amounts in various mixtures of gases and vapors.

There are two different methods of detecting and measuring the presence of certain gases and vapors. One is known as the thermal conduction method wherein resistors in a Wheatstone bridge circuit change their relative resistance in response to change of the thermal conductivity of the gases or vapors to which the resistors are subjected. Such a method is disclosed in my prior Patent No. 2,255,551 granted September 9, 1941. The other method is based on the change in heating of the resistor in a Wheatstone bridge circuit due to the catalytic action on the resistor which varies according to the change of the composition of the gases or vapors. Such a method is disclosed in my pending application Serial No. 678,556, filed June 22, 1946. However, one method is applicable for the detection and measurement of certain gases and vapors, while the other is similarly applicable to other gases and vapors. For example, the presence of carbon dioxide, nitrogen, oxygen, carbon monoxide, etc. are most readily detected by the thermal conduction method, whereas flammable gases and vapors, such as ethylene, gasoline, alcohol, butane, methane, propane, hexane, pentane etc. in the presence of oxygen are most readily determined by the catalytic method. Hydrogen may be detected easily by either method. It is apparent that it would be highly desirable to provide a cell assembly and responsive indicating and control apparatus that would be adaptable for use for all such gases and vapors. Moreover, there are various gases and vapors where the simultaneous use of both methods is needed for proper detection and protection. For example, in the use of butane or propane for combustion, it is desirable to know and adjust for proper combustion efficiency and likewise to determine and protect against dangerous concentration of gases and vapors. The thermal conduction method is well adapted for determining combustion efficiency whereas the catalytic method is well adapted for determining dangerous concentrations and their approach thereto, of these gases and vapors when mixed with air or oxygen. In the latter case the change of thermal conductivity of the gases and vapors is not high enough to have much effect on the thermal conductive resistors or elements. There are numerous instances where the change in the composition of the gases and vapors under variable conditions is such that both methods of detection and measurement are required.

The present invention accomplishes this result in a unitary structure and combines the two methods to give the desired detection, indication and measurement and also, where desired, effects the control of alarms, signals, adjustments, shut-offs and the like according to the particular requirements. The invention is applicable not only to various types of combustion systems but to various chemical processes, protection against undesirable concentration of gases and vapors in rooms, holds of ships and so on, as well as many other instances.

One object of the present invention is to provide a combined method and unitary assembly which will be responsive to both the thermal conductive or conduction method and to the catalytic method, or to either of them. Another object is to give a common indication and measurement of the condition of the gases and vapors detected. Another object is to combine controls therewith which will respond at or near predetermined conditions to actuate alarms, signals, shut-downs, purging means and so forth for protection against the approach to undesirable conditions of the gases and vapors. Other objects and advantages will be understood from the following description and accompanying drawings which show particular applications of the invention as illustrative.

Figure 2:
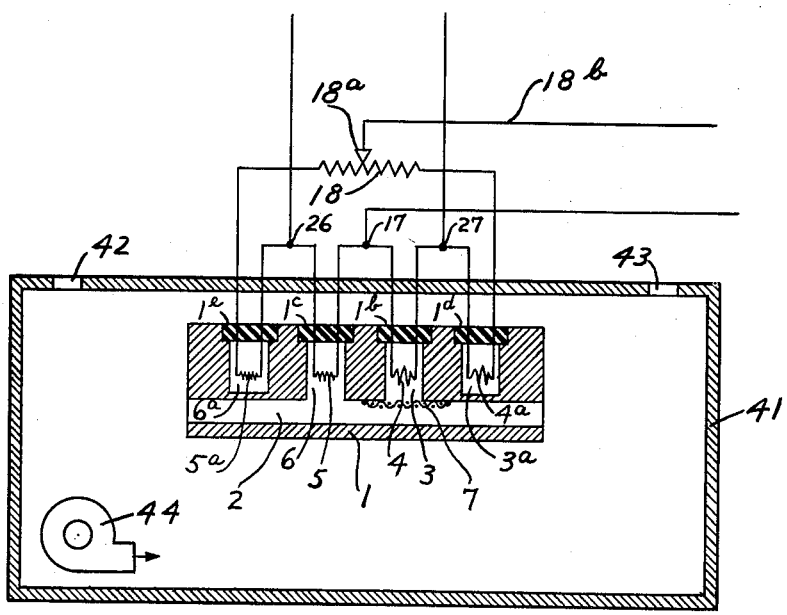

Fig. 1 is a diagram showing the detecting, responsive and controlling apparatus in one application of the invention; and Fig. 2 is a diagram showing a modification of a portion of the apparatus.

Referring to Fig. 1, the detecting cell or analyzer of the vapors and gases to be detected is shown formed of a metal or other heat-conducting block 1 having an opening 2 passing through it lengthwise. Two recesses 3 and 6 are formed in the block which communicate with the passage 2 at two ends of the recesses and are sealed at their outer ends by disks 1b and 1c of insulating material through which pass leads which support and supply current to the resistive elements or resistors 4 and 5 within the recesses. A metal screen 7 of a fine mesh is shown covering the inner end of recess 3. The block also has two other recesses 3a and 6a which are closed against the passage 2 and are sealed at their outer ends by insulating disks 1d and 1e through which pass leads to support and supply current to the resistors 4a and 5a respectively. The cell unit or block is positioned or connected with an enclosure 8 so as to have a sample of the atmospheric content of the enclosure 8 pass through the passage 2 of cell block, as by means of pipe connections 9 and a blower 15. Three-way valves 12 and 16 in the pipe connections 9 are indicated as set for permitting this flow. A blower 14 connected from the pipe 9 to the outside atmosphere serves to purge the enclosure 8 when the three-way valve 16 is positioned to connect the enclosure with the blower 14. An air aspirating bulb 13 serves to pass outside air through passage 2 by positioning the three-way valve 12 for the purpose. The three-way valve 16 must be set to allow flow through the pipe 11 and blower 14 when air is passed through passage 2.

The resistive conductor 4 is in the form of a bare wire or filament which may zig-zag, coiled or straight and is of a material which has a catalytic action when sufficiently heated in the presence of gasoline or alcohol vapors, ethylene, hydrogen and the like or any mixture containing even slight amounts of such flammable gases or vapors in the presence of oxygen.

In order to obtain this catalytic action for detection purposes the temperature of the filament or resistive conductor 4 must be maintained by proper means at a temperature of at least 85° C., and the action increases with increasing temperature of the conductor. But the temperature should be kept below that at which the filament glows. For this reason, as a special safety precaution, the open end of recess 3 may be covered by the wire screen 7 to reduce the fire hazard in case the filament should ever become heated to a glowing temperature. However, there is a wide range of safe operating temperatures below the glow temperature and above 85° C. For example, in the case of platinum the temperature at which it will begin to glow is about 425° C.; and a similar wide range exists for other adaptable metals. The catalytic action increases in the presence of flammable gases or vapors with any increase in their presence in any mixture with air or other oxygen containing gases. The catalytic action due to such presence heats the filament or resistive conductor and this increase in temperature further increases the resistance of the filament or resistive conductor. It follows that a sufficient change of temperature of the catalyst filament may occur under comparatively small increases of flammable gas-air mixtures and thereby be made to respond with a high degree of sensitivity. The size and length of the resistor or filament and the temperature at which it will be maintained for detection will depend upon the material of the filament, the vapors or gases to be detected and the limit in their percentage in air before an alarm or responsive control takes place. The resistor 4 may be made of platinum, palladium, rhodium, and other suitable metals or various alloys thereof. This resistor forms one part of a Wheatstone bridge circuit.

As to the filament of resistor 4a, this is sealed from any contact with the vapors or gases and is consequently unaffected thereby and forms another part of the bridge circuit as later will be explained. It may be different in size and material from the filament 4 but is preferably made the same in these respects for the best results, and serves in the bridge circuit to compensate for changes in ambient temperatures of the cell unit and to balance any change in the temperature of the filament 4 due to ambient temperature responsive changes.

Filament 5 is a thermal conductive element and is a resistive conductor or resistor forming another part of the bridge circuit and is in the form of a bare wire which may be zig-zag, coiled or straight and is of a material such as tungsten, covar, or other suitable metals, or alloys thereof, which does not have a catalytic action as does filament 4. However, platinum may be used for this filament 5, and possibly other metals which also may be used for filament 4, provided the temperature of the filament 5 is kept below that at which any appreciable catalytic action may occur. Filament 5a is sealed from any contact with the vapors or gases and consequently is unaffected thereby and forms another part of the bridge circuit, as later will be explained. It may be different in size and material from filament 5 but is preferably made the same for best results so as to serve in the bridge circuit to compensate for changes in ambient temperatures of the cell unit and balance any change in the temperature of the filament 5 due to ambient temperature changes.

In detecting the presence of gases or vapors by the thermal method, the two resistors 4 and 5 both have their effect in the detection thermally by reason of the fact that the relative resistance of these elements is different in order to secure a deflection and indication by the galvanometer. However, in the presence of flammable gases or vapors and oxygen, the resistor 4 then acts catalytically and gives a deflection and indication accordingly, due to the fact that the catalytic action heats the resistor 4 considerably beyond any change of resistance due to the thermal conductive effect. That is, both elements 4 and 5 function according to the thermal method of detection in cooperation with each other, whereas the element 4 responds only according to the catalytic method of detection.

A uni-directional current source 23 of low voltage, such as six volts, supplies current through a main switch 23a to the bridge circuit and passes from the positive side of the source through intervening connections to the wire 18b and to the adjustable contact 18a of a slide wire resistor 18. Current then passes through a portion of this resistor, then through the resistor 5a and then through resistor 5 to the junction 17, forming one side of the bridge circuit. Current also passes through the other portion of the resistor 18, through resistor 4a and then through resistor 4 to the junction 17, forming the other side of the bridge circuit. From the junction 17 the current returns to the other side of the source 23 through an ammeter 21 and an adjustable resistor 22. The slide wire adjustment is for properly proportioning the current between the two sides of the bridge circuit for initial galvanometer setting. The current in the side containing the resistors 4 and 4a is made greater than that in the side containing the resistors 5 and 5a. The normal value of current in the side 4 and 4a is made such that the catalytic acting resistor 4 is heated to a temperature of at least 85° C. and below the temperature at which it glows for the reasons already explained. The value of the current in the thermal responsive resistor 5 is such that its temperature is always well below 85° C. as it does not have any catalytic action.

An indicating galvanometer 19 has its terminals connected to the junction 26 between the resistors 5 and 5a and the junction 27 between resistors 4 and 4a of the bridge circuit and thus reflects any difference in potential between these junctions. A contact galvanometer 20 is connected in parallel with the other galvanometer between the junctions 26 and 27. The movable vane of the galvanometer 20 carries a contact 20c adapted to engage fixed contacts 20a or 20b under predetermined conditions when moved in opposite directions from its mid-position. The fixed contacts are adjustable for the purpose of being engaged by the contact 20c under desired predetermined conditions. This galvanometer is provided with a winding 20d which when energized acts on the vane 20c to reset it at an intermediate position after engagement with either of the fixed contacts. Such an instrument is commercially available.

This cell unit with its elements connected in the bridge circuit in the manner already explained, provides a combined assembly which will detect and indicate and measure the presence of gases and vapors by both the catalytic method and thermal conductive method, giving a cumulative indication and measurement when both methods are active and likewise an indication and measurement when either one of the methods is active without the other being active, in accordance with the character of the gases and vapors which are analyzed. Under normal and desirable operating conditions in any process, the vane of the galvanometer 19 will assume a deflected position from the zero reading which may be indicated on the dial as the normal position for a particular use. Any departure from the normal operating condition will cause the vane to be deflected from the normal position and indicate and measure the extent of such departure and thus inform the operator that corrective adjustments must be made. The vane is adjusted to assume the zero or central position when air is passed over the filaments or resistors 4 and 5.

For example, let it be assumed that a burner is supplied with propane as a fuel. The products of combustion will then be readily analyzed by the thermal conduction method, and indicate whether the best combustion efficiency is being obtained and whether too rich or too lean a mixture is being used. The galvanometer vane will move from the zero position to the right when the combustion gases are of a proper mixture. Any abnormal increase in the presence of unburnt gases, such as hydrogen, carbon monoxide, etc. will, due to their comparatively high thermal conductivity, decrease the temperature of the resistors 4 and 5 in different degrees by absorbing heat therefrom as compared with a normal desirable condition of the combustion products. The lowered temperatures of the resistors 4 and 5 will decrease their resistances because such resistors have a positive temperature coefficient of resistance. The lowered relative change of resistance of resistors 4 and 5 will lower the potential of the junction point 26 of the bridge circuit relatively to the function point 27 and cause the vane of the galvanometer 19 to be deflected to the left opposite to the normal combustion condition indication to an extent depending upon the departure from the normal condition of the combustion products. If the departure from normal is marked, it will indicate the approach toward a dangerous condition should the gases become mixed with air. If however, the propane flame should become extinguished, resulting in no products of combustion, but only in a mixture of propane and air in the combustion chamber, which becomes dangerous as the per cent by volume of propane in air increases, the catalytically acting resistor 4 now functions and becomes heated above its normal temperature by the catalytic action. This increases its resistance because such resistors have a positive temperature coefficient of resistance and raises the potential of the junction point 27 relatively to that of junction point 26. This causes the vane of the galvanometer 19 to be deflected to the left opposite to the normal combustion indication to a degree depending upon the percentage presence of propane. When a predetermined limit reading of galvanometer 19 is reached which would show an approach to a dangerous condition, galvanometer 20 being in parallel with galvanometer 19, the vane 20c will engage the contact 20a to cause the safety functions to operate as explained below. If a condition arises where unburnt gases, such as hydrogen and carbon monoxide, are present and also propane and air are present, the response is cumulative and causes the vane to move to the left according to the degree of presence of such gases and thus indicate the approach to a dangerous condition by the extent of deflection of the vane.

The combined cell and bridge assembly may be applied to the detection and measurement of the presence of various gases and vapors and indicate whether or not an undesirable condition exists not only in combustion systems, but also in various chemical operations when abnormal conditions may approach dangerous conditions which require correction to improve operating conditions and to avoid possible explosions. Also the invention is applicable to give a constant indication of the condition of the gases in any location and to indicate the degree of departure from normal.

The galvanometers are calibrated according to the particular gases and vapors to be detected and protected against; and such gases and vapors are known for any particular type of system or process. The zero reading of the galvanometers is indicated when air is passed over the resistors 4 and 5 and the currents in the two branches of the bridge circuit are made such, by adjustment of the contact 18a, that the temperature of the thermally responsive resistor 4 is low relatively to that of the heated catalytically responsive resistor 5, the temperature of the latter being at least 85° C. and below the glowing temperature. Mixtures of the various output gases and vapors to be guarded against are made up and successively passed over the resistors 4 and 5. These mixtures are of such proportions of the gases and vapors that they approach the dangerous condition to be guarded against. The galvanometer vanes will be deflected to the left of the zero point to positions which indicate the approach to a dangerous condition. The fixed contact 20a of the contact galvanometer is then adjusted to a position such that it will be engaged by the vane when the mixture causing the least deflection of the vane is passed over the resistors. This insures operation of the controls when the mixture approaching a dangerous condition causes the least deflection and will, of course, likewise cause the controls to operate for all other mixtures which would cause a greater deflection, although the presence of such other mixtures might not approach such a dangerous condition as the mixture causing the least deflection. Thus protection against all mixtures to be guarded against is provided for; also the galvanometer 19 will at all times indicate desirable operating conditions by movement of the vane to the right and show the approach to a dangerous condition by movement of the vane to the left.

It is likewise desirable to apply this combined cell and bridge assembly to effect the control of any desired devices such as alarms, valves, switches and the like for avoiding explosions and any improper operation of a process or apparatus. Fig. 1 shows as an example one such application. It will be understood that in various mixtures of gases and vapors, there may be some mixtures that act on the cell unit according to the thermal method only, some that act according to the catalytic method only, some that act according to both methods in variable degrees and some having no appreciable effect at all. However, in applying the invention to any particular case, it is usually known what gases or vapors are to be guarded against in undesirable amounts; and the use of this invention will detect and measure the presence of such gases and vapors; and in unknown mixtures will show the presence or absence of certain undesired gases and vapors of the character described.

Referring to Fig. 1, a relay having a winding 30 is shown which, when energized, will attract its two movable contacts 30a and 30b from the position shown to engage other contacts. The contact 30b in the position shown engages a fixed contact which is connected to an audible alarm 31 and to a red signal lamp 32. The other terminals of these warning devices are shown connected to the plus side of the source 23. The relay winding 30 has one of its terminals connected through a resistor 33 to the negative side of the source. Its other terminal is connected to a contact of a two-way push button switch 34 and to the movable contact 30a which forms a holding circuit for the relay when energized. The fixed contacts 20a and 20b of the contact galvanometer are connected to the movable contact 30a, as is likewise the adjustable contact 18a of the slide wire resistor. The reset coil or winding 20d of the contact galvanometer is connected on one side to the negative side of the source and on the other side to a contact of the push button switch 34.

Another relay has a winding 35 connected at one terminal to a contact of the switch 34 and to its movable contact 35a which when the winding is energized forms a maintaining circuit. The other terminal of the winding 35 is connected through a resistor 36 to a contact of the relay 30. A push button switch 37 when depressed will short-circuit and deenergize the winding 35. A green lamp bulb 38 is connected in the circuit of the contacts of the two relays, as is likewise the winding 39 of a solenoid adapted to open a valve 40 when energized. The circuit connections of the parts will be understood by the following description of the mode of operation.

Fig. 1 shows the parts in non-operative positions. In starting, the switch 23a is first closed. This merely closes the circuit of the alarm 31 and red lamp 32 by a connection from the positive side of the source through the alarm and lamp, through the movable contact 30b to the negative side of the source. However, the switch 34 is then moved momentarily to its upper position to connect the upper three fixed contacts together. This energizes the relay winding 30 by a circuit from the positive side of the source to the upper right-hand contact of switch 34, through the switch to middle upper contact, then through the winding 30 and resistor 33 to the negative side of the source. The movable contacts 30a and 30b are then attracted, opening the circuit of the alarm and of the red lamp by the movement of contact 30b and closing a holding circuit of the relay by a circuit from positive through contact 30a, winding 30 and resistor 33 to negative. The closing of contact 30a causes current to be supplied to the bridge circuit from positive line through contact 30a to contact 18a and through the bridge circuit in the manner already explained to the ammeter 21 and resistor 22 to the negative line. The closing of switch 34 to its upper position also excites the resetting coil 20d of the contact galvanometer which releases its vane from engagement with either of its fixed contacts in case it was so engaged, this circuit being from positive through switch 34 to its upper left-hand contact, coil 20d and then to negative. The switch 34 may now be released from its upper position and the bridge circuit will continue to function.

The switch 34 is next moved momentarily to its lower position. This energizes the relay winding 35 by a circuit from positive through the lower contacts of switch 34, through winding 35, resistor 36 and contact 30b now closed, to negative. Contact 35a now closes a holding circuit of relay 35 by a circuit from positive through contact 35a, winding 35, resistor 36 and contact 30b to negative. The excitation of winding 35 also closes a circuit through the green lamp 38 and also through winding 39 by a circuit from positive, through contact 35a, then through the green lamp and winding 39 in parallel to contact 30b and to negative. The excitation of winding 39 will open or close a valve 40 as the case may be, or cause actuation of a switch or other device for maintaining normal operation of any system or process as long as the winding 39 is energized. It will be understood that the function of the device 40 may be to obtain any desired control depending upon the condition of the gases and vapors as analyzed by the cell and bridge circuit.

The apparatus is now assumed to be functioning in a normal manner and the reading of the galvanometer 19 will show the presence and extent of the various gases and vapors as determined by the thermal conductive and catalytic methods of detection.

Now let it be assumed that the presence of such gases and vapors have increased in the enclosure 3 due to gradual accumulation, or to the process conducted therein or connected therewith, to such an extent that they show an improper condition or improper operation, or the approach to a dangerous condition. The vane of the contact galvanometer will then be moved so far as to engage contact 20a. This will short-circuit the relay winding 30 by a connection from its upper terminal to the vane and contact 20c, and contact 20b to the lower terminal. This deenergizing of the winding causes its movable contacts to assume the position shown in Fig. 1. This will obviously pass current through the audible signal 31 and red lamp 32 by the contact 30b and thus inform the operator. It will also open by the contact 30a the circuit to the Wheatstone bridge and to the resistors of the cell unit and thus avoid the overheating of the resistor 4 to a glow. It will also open by the contact 30b the circuit of the winding 35 of that relay which will then release its contact 35a and cause the opening of the circuit to the green lamp 38 and to the winding 39. The winding 39 then releases its plunger or armature to control the device 40 to shut down a gas or fuel supply, stop an apparatus controlling the system or process, or start a blower to purge a portion of the apparatus and the like, according to the desired action. After correction of the improper operation or condition, the detecting and control system may be again placed in operation in the manner previously described.

The push button switch 37 is provided for permitting the deenergizing of the relay winding 35 during operating conditions and thereby opening the circuit of the lamp 38 and winding 39. The momentary pressing of this push button short-circuits the terminals of the winding 35 which then releases contact 35a and opens its holding circuit. The purpose of this use of the push button 37 is to permit the closing of the valve 40 or the control of such other device, for stoppage, or repairs or adjustments without the necessity of interrupting the bridge detector circuit or interfering with the warning control by the contact galvanometer of its circuit. When it is desired to again actuate the device 40 by the winding 39, the switch 34 is moved momentarily to engage its lower contacts which controls the relay winding 35 to attract its contact 35a and energize winding 39 and lamp 38 in the manner already described.

It should be noted that when the contact galvanometer vane engages the contact 20a at some predetermined undesirable condition of the gases and vapors, not only are the relays controlled to give an alarm and signal indications and automatic operation of the device 40, but the current to the bridge circuit is discontinued. This avoids, as already stated, the possible excessive heating of the catalytic resistor 4 to a glowing temperature which if allowed to continue might cause ignition of the gases and vapors, although the screen 7 reduces such a hazard. In case any one of the resistors in the bridge circuit should become defective, it would so unbalance the bridge circuit as to cause the vane of the contact galvanometer to engage either the contact 20a or 20b, depending upon which resistor becomes defective. This would cause operation of the controls in the manner already described and prevent continued operation of the bridge circuit until the defective resistor becomes replaced.

In Fig. 1 the cell block is subjected to the gases and vapors to be tested by a forced flow from the enclosure 8 and is outside the enclosure. In many cases the cell block may be inserted within the enclosure, room, hull of a ship or within any space desired where detection is to be determined. Fig. 2 shows the cell block introduced within an enclosure or compartment 41. Here the gases and vapors within the enclosure diffuse through both ends of the opening 2 in the cell block 1 and affect the resistors of filaments 4 and 5 in the same manner as previously described. The parts of Fig. 2 corresponding with those of Fig. 1 are designated by the same reference characters and will be understood as being connected in the indicating and control circuits in the same manner as in Fig. 1.

The enclosure 41 may be a closed or ventilated compartment according to conditions or to the manufacturing process used. Ventilating openings 42 and 43 are shown in the enclosure when the compartment is not of the closed type. A blower 44 is shown positioned within the compartment which may be located at any desirable place for circulation of the gas and vapor mixture in order to maintain a uniform condition of the mixture and to avoid concentration of gases and vapors in particular locations or pockets.

Although particular embodiments of this invention have been disclosed, it will be understood that various modifications may be made for adaptation to particular requirements without departing from the scope thereof. It is obvious that the device 40 may be a valve which is automatically closed when the relay winding 39 is energized instead of being opened as described and the device 40 may be a switch automatically opened or closed, or any other form of actuated device for securing the desired operation according to the required function of such a device when incorporated in any process or apparatus.

I claim:

1. A cell unit for subjection to the passage of gases and vapors to be tested comprising a resistor whose resistance is affected by change in the thermal conductivity of the gases and vapors and a resistor whose resistance is affected at a temperature of at least 85° C. and below its glowing temperature by the catalytic action of the gases and vapors thereon, a bridge circuit in which said resistors are connected in different legs thereof, and indicating means connected to said bridge circuit for giving a cumulative indication of the change of resistance of said resistors.

2. A cell unit for subjection to the passage of gases and vapors to be tested comprising a resistor whose resistance is affected by change in the thermal conductivity of the gases and vapors and a resistor whose resistance is affected at a temperature of at least 85° C. and below its glowing temperature by the catalytic action of the gases and vapors thereon, and also comprising resistors which are not exposed to the gases and vapors for compensating for ambient changes in temperature of the cell unit, a bridge circuit in which said resistors are connected in different legs thereof, and indicating means connected to said bridge circuit for giving a cumulative indication of the change of resistance of said first two named resistors.

3. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, and indicating means connected to the bridge circuit affected cumulatively by change of resistance of said two resistors.

4. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, and indicating means connected to the bridge circuit affected cumulatively by change of resistance of said two resistors, said two resistors being connected relatively to each other in the bridge circuit to give a cumulative indication by said indicating means when said two resistors respond to increase in the presence of said certain gases and vapors.

5. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, indicating means connected to the bridge circuit affected cumulatively by change of resistance of said two resistors, and means connected to the bridge circuit for normally passing more current through the said catalytically responsive resistor than through the said thermally responsive resistor.

6. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, indicating means connected to the bridge circuit affected cumulatively by change of resistance of said two resistors, and means connected to the bridge circuit for normally heating the said catalytically responsive resistor to a higher temperature than the temperature of the said thermally responsive resistor.

7. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, indicating means connected to the bridge circuit affected cumulatively by change of resistance of said two resistors, and means connected to the bridge circuit for insuring the temperature of the said catalytically responsive resistor to be normally at a temperature of at least 85° C. and below the glowing temperature.

8. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, and indicating means connected to the bridge circuit affected cumulatively by change of resistance of said two resistors, said resistors being mounted in a single cell unit for exposure to said gases and vapors.

9. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, and indicating means connected to the bridge circuit affected cumulatively by change of resistance of said two resistors, said resistors being mounted in a single cell unit having a passage therethrough for passing said gases and vapors to said resistors.

10. Apparatus for detecting the presence of certain gases and vapors comprising a source of current, a bridge circuit supplied with current from said source, two resistors in one leg of the bridge circuit, one of said resistors being subjected to the gases and vapors and whose resistance is affected by change in thermal conductivity of the gases and vapors, two resistors in another leg of the bridge circuit, one of said last named resistors being subjected to the gases and vapors and whose resistance is affected at a temperature of at least 85° C. and below its glowing temperature by the catalytic action of the gases and vapors thereon, said thermally responsive resistor and said catalytically responsive resistor being both connected in the bridge circuit to the same side of said source, and indicating means connected to the bridge circuit affected by change of resistance of said two responsive resistors.

11. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, and means affected cumulatively by change of resistance of said resistors for automatically cutting off the supply of current to said bridge circuit upon the presence of said certain gases and vapors attaining a predetermined amount.

12. Apparatus for detecting the presence of certain gases and vapors comprising a source of current, a bridge circuit supplied with current from said source, at least two resistors in the bridge circuit, at least one of said resistors being subjected to the gases and vapors and whose resistance is affected by change in the thermal conductivity of the gases and vapors, the other of said two resistors being subjected to the gases and vapors and whose resistance is affected at a temperature of at least 85° C. and below its glowing temperature by the catalytic action of the gases and vapors thereon, a controlled device, and means affected cumulatively by change of resistance of said resistors for automatically controlling said device upon the presence of said gases and vapors attaining a predetermined amount.

WALTER J. WILLENBORG.

REFERENCES CITED

The following references are of record in the file of this patent:

UNITED STATES PATENTS

| Number | Name | Date |
|---|---|---|
| 1,302,871 | Spice | May 6, 1919 |
| 1,955,897 | Vertucci | Apr. 24, 1934 |
| 2,204,966 | Morgan et al. | June 18, 1940 |
| 2,372,530 | Sommermeyer | Mar. 27, 1945 |
| 2,441,677 | Stallsmith | May 18, 1948 |

FOREIGN PATENTS

| Number | Country | Date |
|---|---|---|
| 250,478 | Great Britain | Apr. 15, 1926 |
| 730,504 | France | Aug. 17, 1932 |